(12) United States Patent
Nazir

(10) Patent No.: US 10,652,267 B2
(45) Date of Patent: May 12, 2020

(54) SAAS CONFIGURATION AND SECURITY ANALYSIS ENGINE

(71) Applicant: DigitSec, Inc., Seattle, WA (US)

(72) Inventor: Waqas Nazir, Seattle, WA (US)

(73) Assignee: DigitSec, Inc., Seattle, WA (US)

( * ) Notice: Subject to any disclaimer, the term of this patent is extended or adjusted under 35 U.S.C. 154(b) by 85 days.

(21) Appl. No.: 15/995,733

(22) Filed: Jun. 1, 2018

(65) Prior Publication Data

US 2018/0351989 A1    Dec. 6, 2018

Related U.S. Application Data

(60) Provisional application No. 62/514,603, filed on Jun. 2, 2017.

(51) Int. Cl.
| | |
|---|---|
| *H04L 29/06* | (2006.01) |
| *G06F 21/57* | (2013.01) |
| *G06F 21/56* | (2013.01) |
| *H04L 12/24* | (2006.01) |
| *G06N 20/00* | (2019.01) |

(52) U.S. Cl.
CPC ........ *H04L 63/1433* (2013.01); *G06F 21/562* (2013.01); *G06F 21/566* (2013.01); *G06F 21/577* (2013.01); *H04L 41/0803* (2013.01); *G06F 2221/033* (2013.01); *G06N 20/00* (2019.01)

(58) Field of Classification Search
CPC ............ H04L 63/1433; H04L 41/0803; G06F 21/577; G06F 21/562; G06F 21/566; G06F 2221/033; G06N 20/00
See application file for complete search history.

(56) References Cited

U.S. PATENT DOCUMENTS

| | | | | |
|---|---|---|---|---|
| 2014/0215621 | A1* | 7/2014 | Xaypanya | ............. H04L 63/145 726/23 |
| 2016/0028688 | A1 | 1/2016 | Chizhov et al. | |
| 2016/0315960 | A1* | 10/2016 | Teilhet | ................ H04L 63/1433 |

OTHER PUBLICATIONS

International Patent Application No. PCT/US2018/035719; Int'l Search Report and the Written Opinion; dated Aug. 24, 2018; 9 pages.
International Patent Application No. PCT/US2018/035719; Int'l Preliminary Report on Patentability; dated Dec. 3, 2019; 7 pages.

* cited by examiner

*Primary Examiner* — Nelson S. Giddins
(74) *Attorney, Agent, or Firm* — BakerHostetler

(57) ABSTRACT

A security scanner reviews the configuration of a SaaS environment, analyzes the static code of the environment, and generates malicious code to create a runtime security analysis engine that is executed to determine security vulnerabilities within the SaaS environment.

20 Claims, 11 Drawing Sheets

SAAS CONFIGURATION AND SECURITY ANALYSIS ENGINE

CROSS-REFERENCE TO RELATED APPLICATIONS

This application claims benefit under 35 U.S.C. 119 to U.S. application Ser. No. 62/514,603, entitled "SaaS Configuration and Security Analysis Engine," filed on Jun. 2, 2017, and incorporated herein by reference in its entirety.

BACKGROUND

Configurable Software as a Service (SaaS) environments may have vulnerabilities introduced due to an insecure configuration or insecure code. With each customization and increasing complexity of the SaaS environment, critical and high risk security vulnerabilities may be introduced into the SaaS application. These vulnerabilities may not be detectable by conventional security software.

BRIEF DESCRIPTION OF THE DRAWINGS

To easily identify the discussion of any particular element or act, the most significant digit or digits in a reference number refer to the figure number in which that element is first introduced.

DETAILED DESCRIPTION OF ILLUSTRATIVE EMBODIMENTS

Overview

Embodiments of a security scanner system and process disclosed herein generate a runtime security analysis engine within a SaaS environment based on the specific configurations and customized code (machine instructions and data) of a tenant of the SaaS environment. A runtime security analysis engine then creates and operates exploit payloads to test the customized SaaS environment for vulnerabilities, including persistent threats.

Once initiated, the security scanner operates unattended by a user within the SaaS environment to combine static and dynamic analysis to identify and provide proof of concept exploits along with the vulnerabilities and the successful breaks and exploitations recorded during the execution of the runtime security analysis engine. The security scanner may also provide an indication of the severity of each identified security issue, the status of each issue, sample code or exploit, remediation guidance, links to additional material regarding the vulnerabilities, and setting recommendations.

EMBODIMENTS

Figure 1:
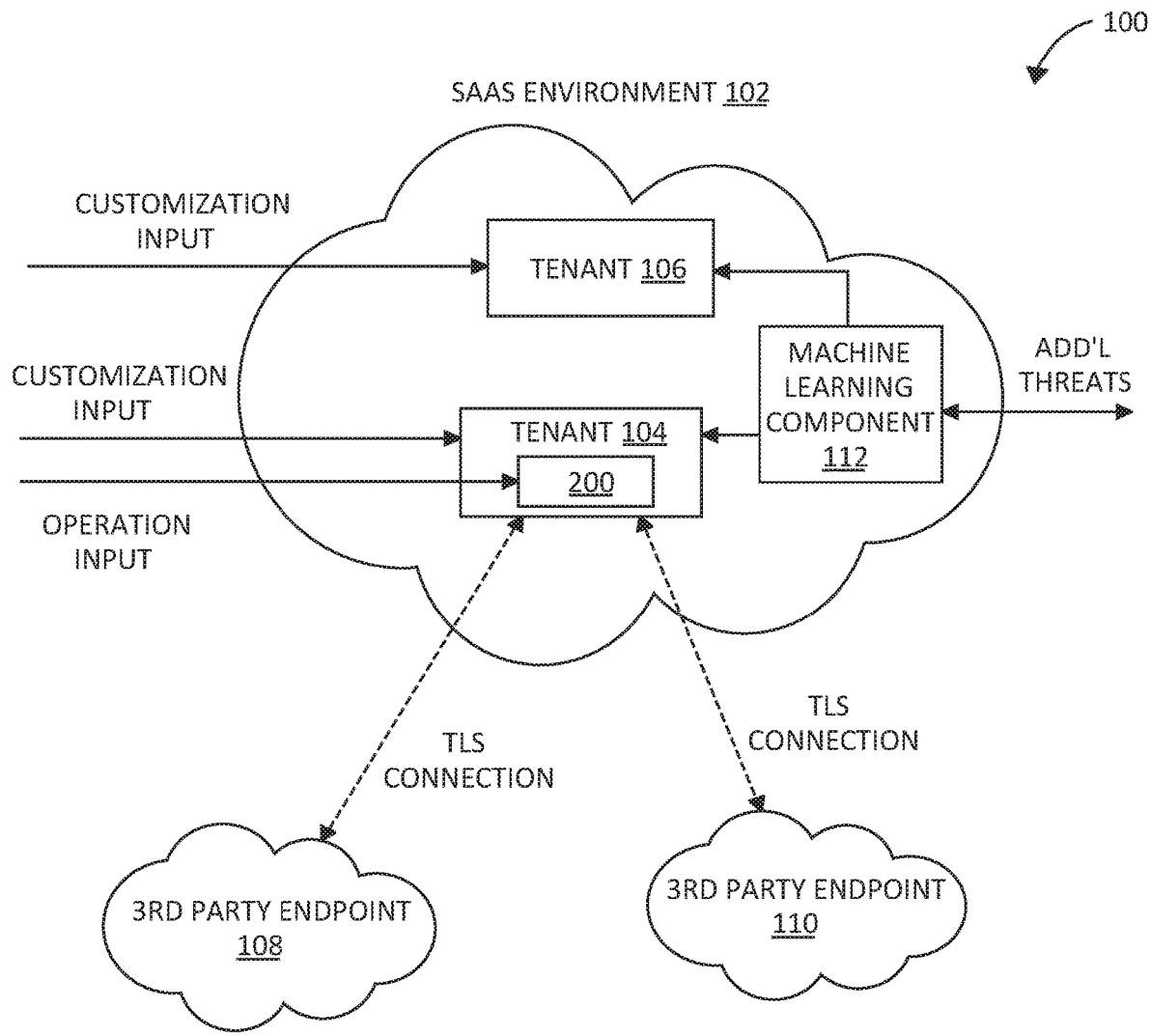
FIG. 1 illustrates an embodiment of an operating environment 100.

Referring to FIG. 1, an operating environment 100 comprises a SaaS environment 102, a 3rd party endpoint 108, and a 3rd party endpoint 110. The SaaS environment 102 further comprises a tenant 104, a tenant 106, and a machine learning component 112. The tenant 104 comprises the security scanner 200 in this example. The SaaS environment 102 thus provides an operating environment for one or more tenants, including the tenant 104 and the tenant 106.

Each of the tenant 104 and the tenant 106 operates the SaaS environment 102 for a specified group of users. The tenant 104 and tenant 106 may receive configuration input(s) to alter the operation of the SaaS environment 102 for that tenant. Customizations may include exposing features of the tenant to the Internet and writing custom applications (e.g., application program interfaces, web applications, Internet of Things endpoints) to operate within the tenant. The tenant 104 and the tenant 106, along with other tenants within the SaaS environment 102 send tenant operating instructions (e.g., code), detected threats, detected exploits, persistent threats, remediation guidance, altered operating instructions, etc. to the machine learning component 112. The tenant 104, the tenant 106, and other tenants within the SaaS environment 102 may receive an operation input from the machine learning component 112. This operation may initiate the security scanner 200 to operate within the tenant. The machine learning component 112 sends the operation input to one or more tenants based on threats detected from other tenants or threats detected from outside the SaaS environment 102. The threats and instructions to or from which the threats occurred are utilized to determine labels and features for the machine learning component 112. The machine learning component 112 may then determine which other tenants may have similar features that may indicate a threat to that tenant. The machine learning component 112 then sends an operation input to that tenant. The machine learning component 112 may also update the security scanner 200 to alter its operations, such as the malicious data generation process 500 and the security analysis engine generation process 600 described in FIG. 5 and FIG. 6, respectively.

The tenant 104 may in this example exchange information via a Transport Layer Security (TLS) connection with one or more 3rd party endpoints, such as the 3rd party endpoint 108 and the 3rd party endpoint 110.

The 3rd party endpoint 108 and the 3rd party endpoint 110 may exchange information with the tenant 104. Exemplary 3rd party endpoints include Google™ and SAP™.

The security scanner 200 resides in the tenant 104. The security scanner 200 operates in response to an operation input to identify security deficiencies introduced by the customization input.

Figure 2:
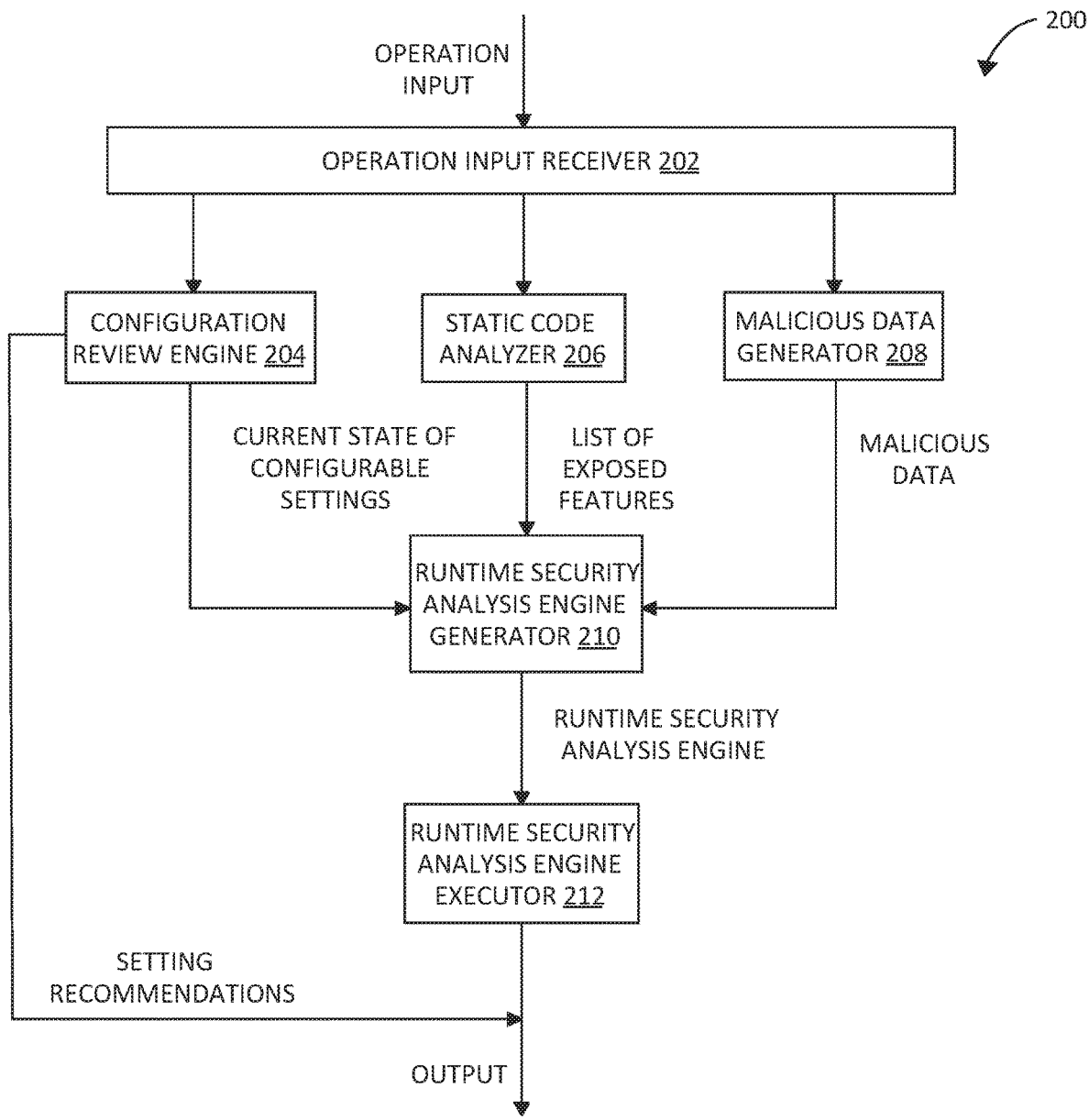
FIG. 2 illustrates an embodiment of a security scanner 200.

Referring to FIG. 2, the security scanner 200 comprises an operation input receiver 202, a configuration review engine 204, a static code analyzer 206, a malicious data generator 208, a runtime security analysis engine generator 210, and a runtime security analysis engine executor 212.

The operation input receiver 202 receives the operation input and sends the operation input to the configuration review engine 204, the static code analyzer 206, and the malicious data generator 208.

The configuration review engine 204 receives the operation input from the operation input receiver 202. The configuration review engine 204 determines a current state of configurable settings and setting recommendations. The configuration review engine 204 sends the current state of the configurable settings to the runtime security analysis engine generator 210 and sends the setting recommendations to the output. The configuration review engine 204 may be operated in accordance with the process depicted in the FIG. 3.

The static code analyzer 206 receives the operation input from the operation input receiver 202. The static code analyzer 206 determines a list of exposed features and sends the list of exposed features to the runtime security analysis engine generator 210. The static code analyzer 206 may be operated in accordance with the process depicted in the FIG. 4.

The malicious data generator 208 receives the operation input from the operation input receiver 202. The malicious data generator 208 generates malicious data and sends the malicious data to the runtime security analysis engine generator 210. The malicious data generator 208 may be operated in accordance with the process depicted in the FIG. 5.

The runtime security analysis engine generator 210 receives the current state of the configurable settings, the list of exposed features, and the malicious data from the configuration review engine 204, the static code analyzer 206, and the malicious data generator 208, respectively. The runtime security analysis engine generator 210 interfaces the runtime security analysis engine to the runtime security analysis engine executor 212. The runtime security analysis engine generator 210 may be operated in accordance with the process depicted in the FIG. 6.

The runtime security analysis engine executor 212 operates the runtime security analysis engine from the runtime security analysis engine generator 210 and generates an output. The output may be combined with the setting recommendations. The output may comprise the severity of the security findings, the status of the findings, a sample code or exploit, remediation guidance, and links to additional material. The runtime security analysis engine executor 212 may be operated in accordance with the process depicted in the FIG. 7.

The security scanner 200 may be deployed and hosted within a SaaS environment. Therefore, sandbox security is not breached. The security scanner 200 may utilize a smart runtime engine with built-in intelligence to create attack payloads which are applicable to a given environment and, thus, decrease invalid test cases. The security scanner 200 may combine static and dynamic analysis, whereas conventional security scanners provide one or the other. The security scanner 200 may identify persistent threats, which may reside within an environment and then be exploited at a later time. The security scanner 200 may provide proof of concept exploits along with the vulnerabilities to reproduce findings and perform regression testing. The security scanner 200 may operate unattended by a user, upon receiving the operation input. In some embodiments, a machine learning component may initiate the operation input.

Figure 3:
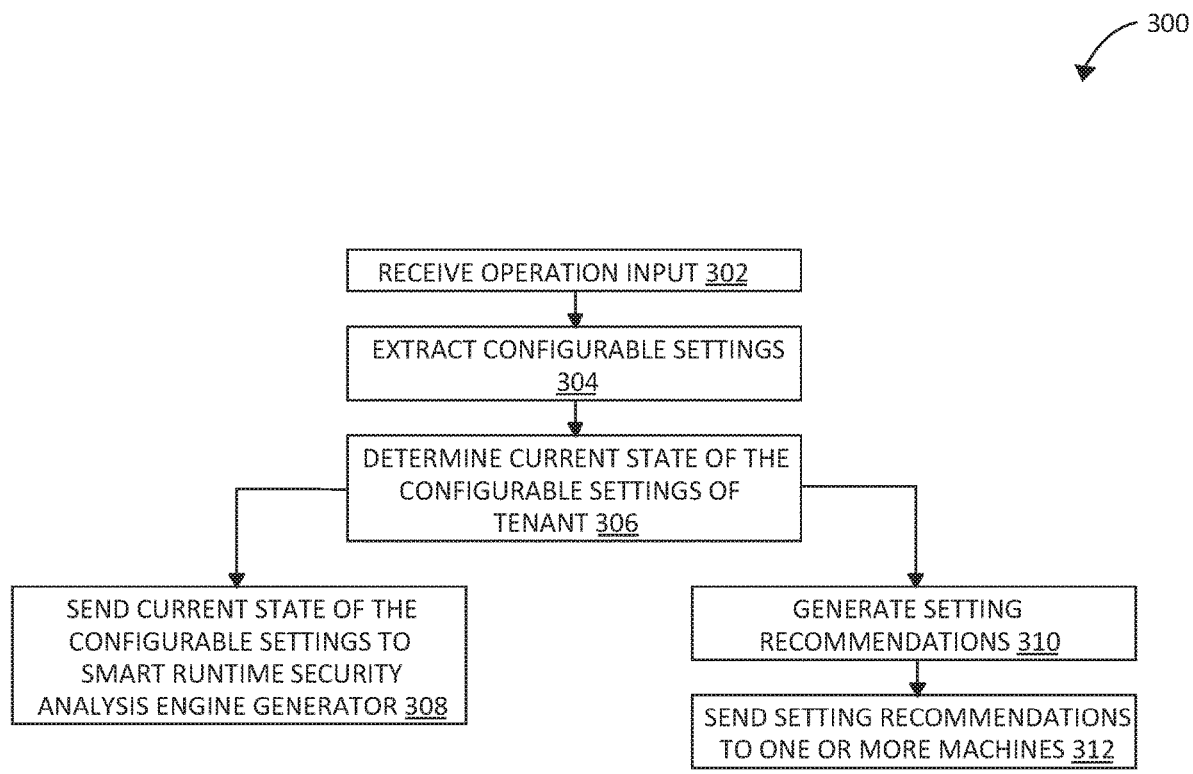
FIG. 3 illustrates an embodiment of a configuration review process 300.

Referring to FIG. 3, an embodiment of a configuration review process 300 receives the operation input (block 302). The configurable settings are extracted (block 304). The configured settings of the tenant are determined (block 306). The configured settings are sent to a runtime security analysis engine generator (block 308). The setting recommendations are generated based on the configurable settings and the configured setting (block 310). The setting recommendations are then applied to alter the configuration of one or more machines (block 312).

In some embodiments, the configuration review process 300 extracts configurable settings for passwords. If the password policies are configurable for the SaaS environment, the configuration review process 300 may review the password configurations for password strength, invalid login lockout, and two factor authentication, for example.

Password strength is a measure of the effectiveness of a password against malicious attacks, such as password guessing, dictionary attack, or brute force attacks. Password strength may be measured based on the length, complexity, and unpredictability of a given password. Password strength estimates, in some implementations, how many trials an attacker who does not have direct access to the password would need, on average, to guess the password correctly. The configuration review process 300 receives a strong password policy. The current password strength is determined and compared the strong password policy. A recommendation is provided to alter the password to bolster any weakness in password strength.

Invalid login attempt lockouts may be utilized to protect against brute-force attacks. If the number of invalid attempts received is greater than a lockout policy setting, a SaaS system may lockout an account. The configuration review process 300 determines whether an account lock out for invalid attempts is enforced or not. If not, a recommendation is generated, which may comprise enforcing a lockout and the number of invalid attempt prior to lockout.

Two factor authentication (2FA) is a method of requiring two pieces of information (often independently obtained from one another) to assert the identity of a user. Typically the two factors are depended upon: 1) something a user knows, such as password, shared secret, etc.; and 2) something a user has, such as a biometric, a 2FA hardware token, a one-time code sent to a user's phone, etc. 2FA controls may be more secure than single factor authentication based on passwords. The configuration review process 300 determines whether the SaaS platform has 2FA capabilities and whether the 2FA capabilities are enabled. If present and not enabled, the configuration review process 300 generates a recommendation to enable the 2FA.

In some embodiments, the configuration review process 300 determines the integration endpoints for both client side and the server side and also determines the configuration for each integration endpoint. The endpoints and their associated configuration may be assessed regarding the Transport Layer Security (TLS), the authentication controls, unauthorized access, and maliciousness.

TLS comprises cryptographic protocols that provide communications security over a network. TLS is utilized to secure communications between servers over computer networks. The TLS protocol provides privacy and data integrity between two communicating computer applications. When secured by TLS, connections between a client (e.g., an API, browser, mobile device) and a server (e.g., SaaS application) may be private and not susceptible to network eavesdropping. TLS also provides identity verification between the communicating parties due to the use of public-key cryptography. The configuration review process 300 determines the presence of TLS connections when communicating against 3rd party endpoints.

The endpoint may not enforce an authentication, which may lead to compromise of data exposed at the endpoint. The configuration review process 300 determines the presence of secure controls and flags endpoints that do not require authentication controls.

The endpoint may not be approved by a user-defined policy and thus expose the users to undue risk or vulnerabilities. The configuration review process 300 determines a list of the endpoints, both server side and client side, that communicate to or from the SaaS environment. The list of endpoints may be sent to one or more machines to be reviewed or may be compared to the user-defined policy (e.g., an approved/authorized list) to determine unauthorized 3rd party endpoints.

An endpoint may be known to be malicious, such as comprising malware, ransomware, etc. The configuration review process 300 compares the list of endpoints to which a SaaS environment communicates to a list of known malicious endpoints or recently compromised endpoints. A recommendation to remove the endpoints that are both communicated to and known to be malicious is generated.

The following logic (in one example computer instruction language) may be utilized to implement configuration engine static checks:

```
Read_Current_State_of_SaaS_Environment( );
If (value_of_current_configuration
!= a_secure_state_defined_by_S4_or_customer)
{
Flag_And_Report_Vulnerability( );
}
```

The configuration review process 300 may also be configured to generate custom rules applicable to each unique SaaS environment. The custom rules may identify and assess a unique configuration setting.

Figure 4:
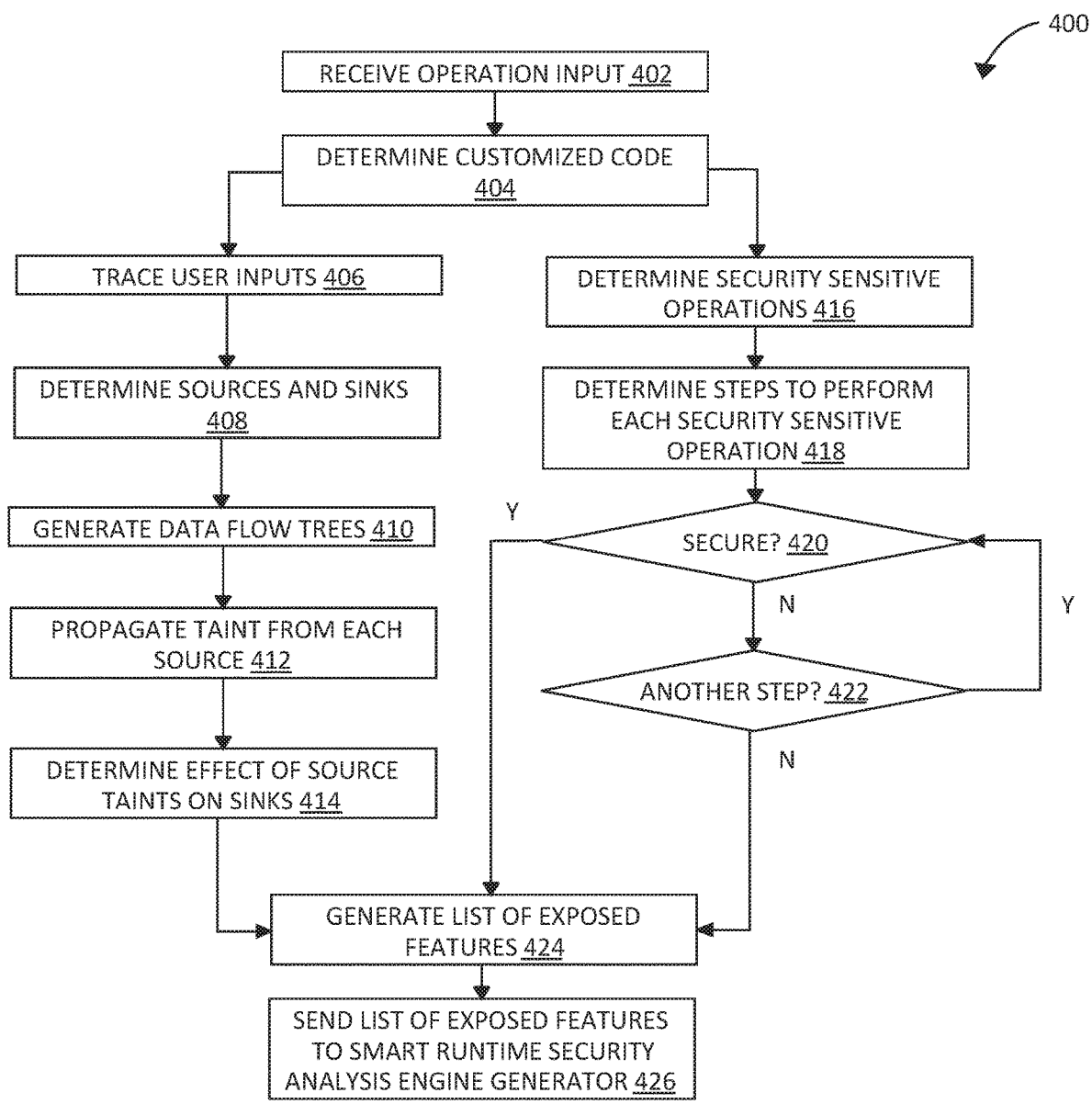
FIG. 4 illustrates an embodiment of a static code analysis process 400.

Referring to FIG. 4, an embodiment of a static code analysis process 400 receives the operation input (block 402). The customized code is then determined (block 404). The code of the tenant may be compared to the code of the initial SaaS environment. Data Flow Analysis (DFA) is utilized to gather information regarding the possible set of values calculated at various points in a computer program. User inputs are traced (block 406). The sources and sinks for each of the user inputs are determined (block 408). Data flow trees are generated based on the source and sink paths (block 410). A taint is then applied to each or the sources and propagated to the sinks (block 416). The effect of the source taints on the sinks is determined (block 414). Control Flow Analysis (CFA) is utilized to determine how control is passed within an application. CFA may be utilized by malware analysis to protect against redirection of program execution to unwanted and/or unauthorized code.

Security sensitive operations are determined (block 416). The steps to perform each security sensitive operation are determined (block 418). Call flows for the entire code base may be generated and a reverse walk preformed from the security sensitive operations to determine whether there is controlled access to each of the security sensitive operations.

The security of each step to a security sensitive operation is determined (decision block 420). If one or more of the security sensitive operations is not secure, the static code analysis process 400 determines whether there is another step (decision block 422). If so, the static code analysis process 400 determines whether each step prior is secured until determining that each of the security sensitive operations is either secure or has one or more flow paths (i.e., an input followed by one or more steps to the security sensitive operation) that is unsecured.

A list of exposed features is generated (block 424). The list of exposed features may comprise affected sinks associated with a source input and each of the flows paths that results in unsecured access to a security sensitive operation. The list of exposed features may be utilized to generate the attack surface that the runtime engine (RTE) will utilize to attack the SaaS environment.

Figure 5:
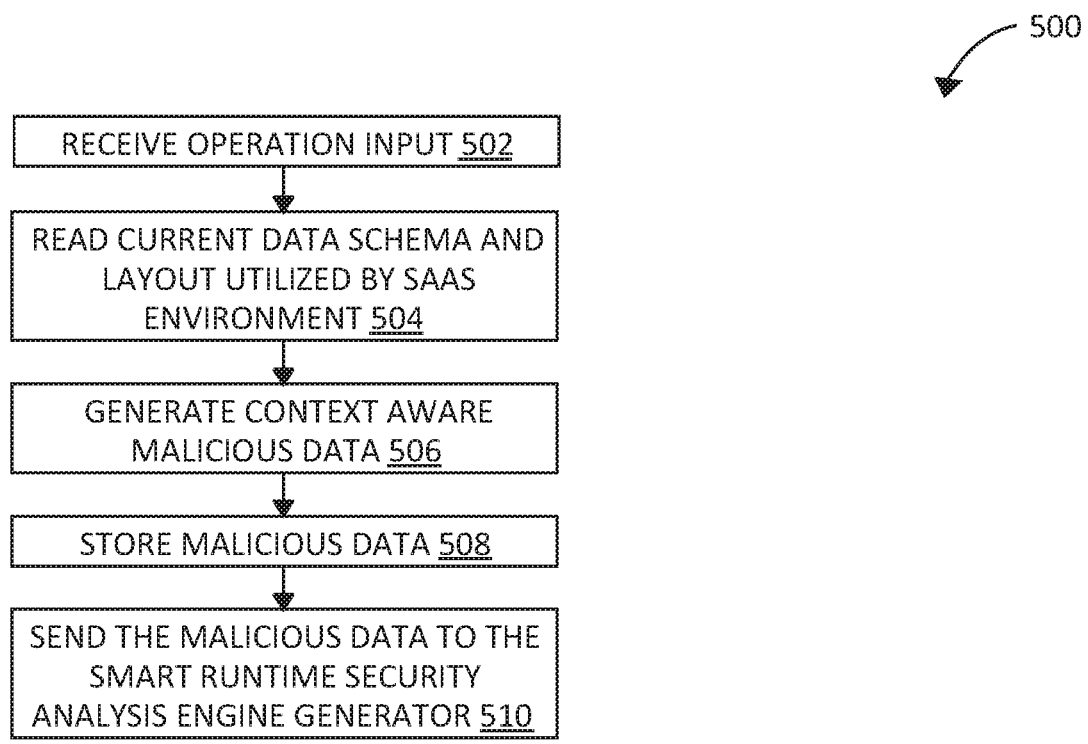
FIG. 5 illustrates an embodiment of a malicious data generation process 500.

Referring to FIG. 5, an embodiment of a malicious data generation process 500 receives the operation input (block 502). The current data schema and layout utilized by the SaaS environment is read (block 504). The context aware malicious data is generated (block 506). The context aware malicious data may be received from the machine learning component 112 based on threats determined from other tenants and outside sources. The context aware malicious data may be further influenced by the current data schema and layout utilized by the SaaS environment.

The current data schema and layout utilized by the SaaS environment may be compared to other data schema and layouts that were determined to be susceptible to specific malicious data. That malicious data is then utilized to generate the context aware malicious data. The malicious data is then stored (block 508). The key and metadata for the malicious data may also be stored. The malicious data is then sent to the runtime security analysis engine generator (block 510).

Figure 6:
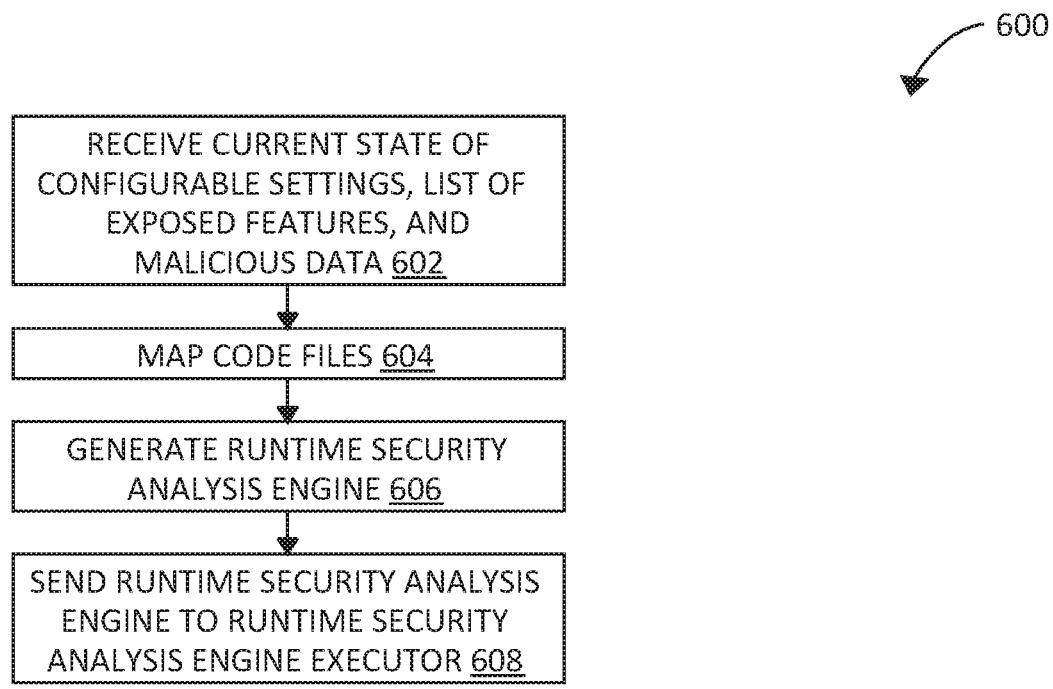
FIG. 6 illustrates an embodiment of a security analysis engine generation process 600.

Referring to FIG. 6, an embodiment of a security analysis engine generation process 600 receives the current state of the configurable settings, the list of exposed features, and the malicious data (block 602). The code files are mapped (block 604). The code files of the deployment environment may be mapped to the test environment. The mapping may allow attack vectors against a given file to be linked to an addressable or accessible entry in the SaaS environment. The mapping may be influenced by threats detected to other tenants or to threats determined from external sources by the machine learning component. The runtime security analysis engine is generated (block 606). The runtime security analysis engine may have proof of concept exploit payloads and generation exploits may be correlated with the map generated. The runtime security analysis engine is sent to the runtime security analysis engine executor (block 608).

Figure 7:
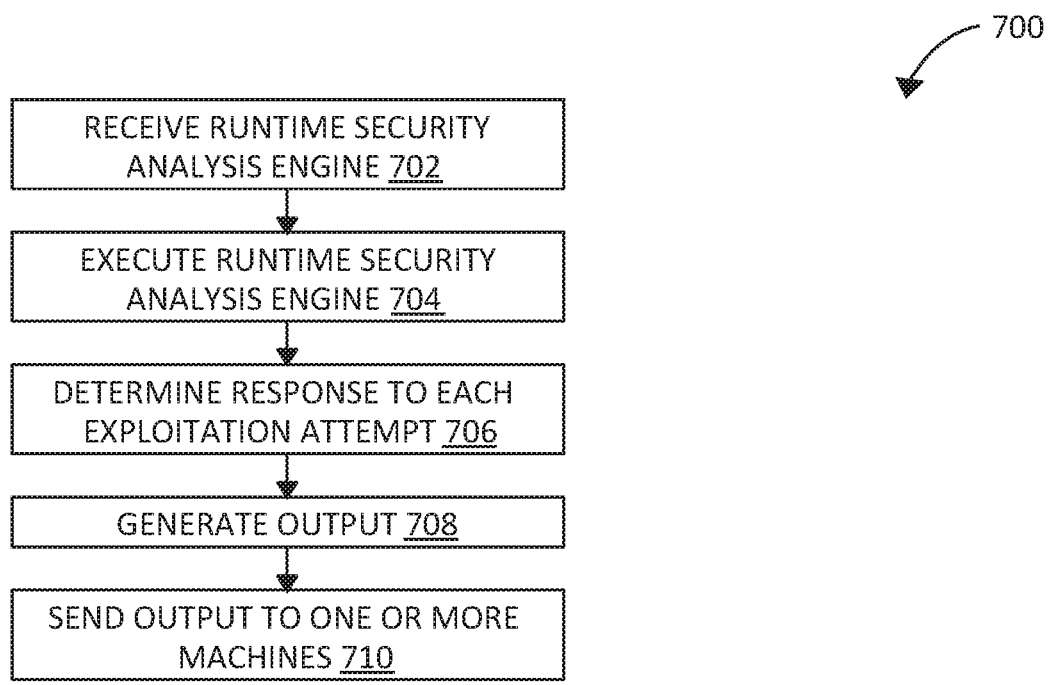
FIG. 7 illustrates an embodiment of a runtime security analysis engine process 700.

Referring to FIG. 7, an embodiment of a runtime security analysis engine process 700 engages the runtime security analysis engine (block 702). The runtime security analysis engine is executed (block 704). The response to each exploitation attempt is determined (block 706). Listeners may be deployed in the environment to determine exploit situations and log them along with the exploit payloads. The execution (fuzzing) may be throttled to help ensure that the system has the ability to process the exploit payloads and no payloads are missed. An output is generated (block 708) and sent to one or more machines (block 710). The output may comprise the successful breaks and exploitations recorded during the execution of the runtime security analysis engine. The output may further comprise the severity of each security finding, the status of each finding, sample code or exploit, remediation guidance, and links to additional material. The setting recommendations may also be added to the output, and/or applied to affect the configuration of the machines to reduce vulnerabilities. The output may further be sent to the machine learning component 112. The machine learning component 112 may then determine other tenants for which the determined threats may apply and send an operation input to update and initiate operation of the security scanner 200 for those other tenants.

Figure 8:
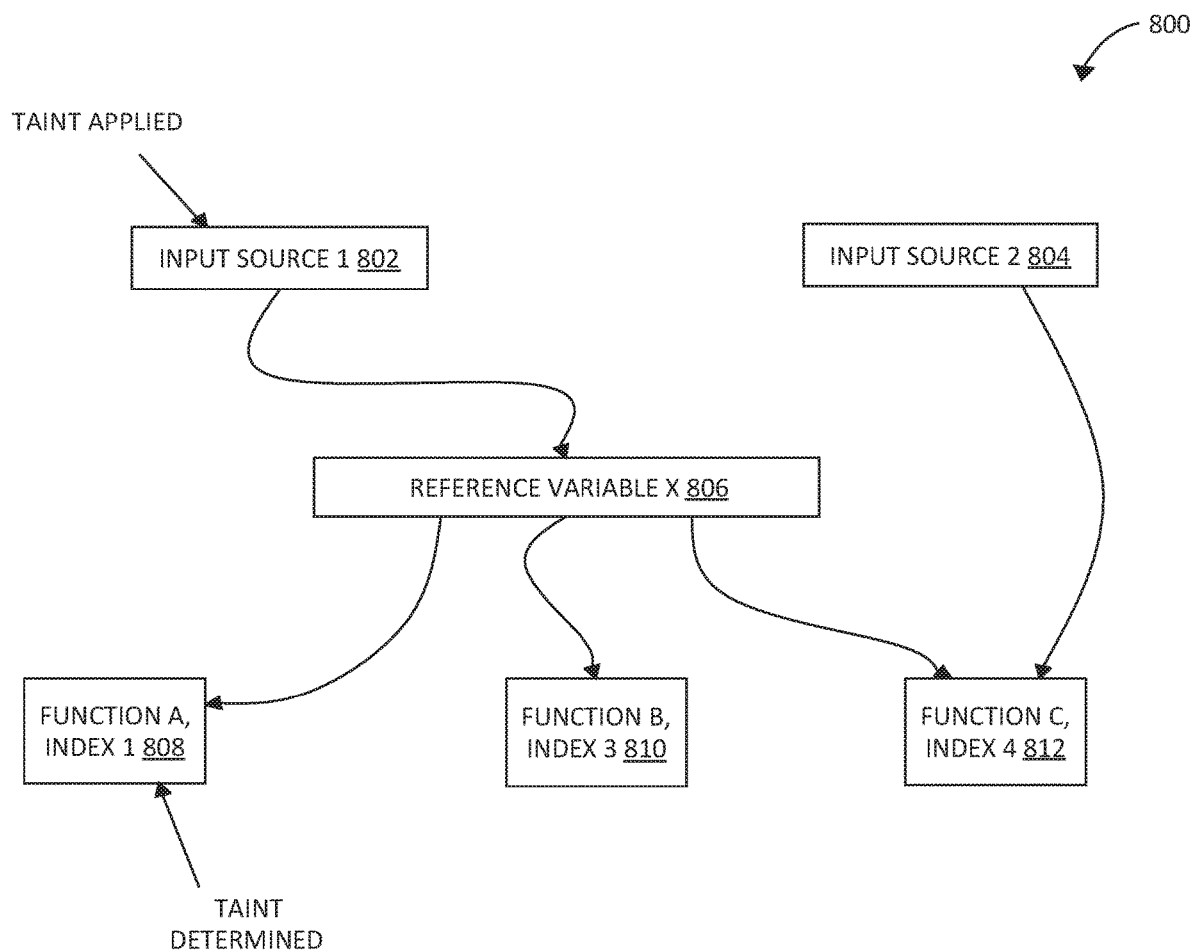
FIG. 8 illustrates an embodiment of a data flow 800.

Referring to FIG. 8, an exemplary data flow 800 comprises an input source 1 802; an input source 2 804; a reference variable x 806; a function A, index 1 808; a function B, index 3 810; and a function C, index 4 812.

The input source 1 802 is passed as a reference to reference variable X. The input source 2 804 is passed to Function C. The reference variable x 806 receives the input source 1 802 and is passed to three functions, the function A, index 1 808, the function B, index 3 810, and the function C, index 4 812.

As depicted in FIG. 8, the input source 1 802 is a tainted input trace. As the input source 1 802 is applied to the reference variable x 806 and then to the function A, index 1 808, the function B, index 3 810, and the function C, index 4 812, each may be a tainted sink. Each potential taint sink is then evaluated to determine whether the function is tainted. As depicted in FIG. 8, the function A, index 1 808 is determined to be tainted. The function A, index 1 808 thus results in a vulnerability.

The data flow 800 depicted in FIG. 8 is a simplified data flow. A source code may comprise many data types, such as complex data maps, key value pairs, generic list types, arrays, etc. The data flow may also comprise bound or unbound loops, which results in more complex Data Flow Analysis.

The following (which is an example in one of many possible computer instruction languages) may be utilized to implement Data Flow Analysis vulnerability:

var x=Input_1;
    ...
    functionC(x, . . . );
    functionB(x, . . . );
    functionA(x, . . . );

Tainted variables and vulnerable data flow may be highlighted or otherwise indicated. In some embodiments, once a taint has be determined, an active correction process is performed. The active correction process alters the operating instruction to remove the taint. In the exemplary data flow 800, the tainted function A, index 1 808 may be replaced by a safe function (e.g., function S). Additionally, the exemplary data flow 800 may have the reference variable x 806 replaced by a secure variable Y. In embodiments where multiple corrections may be performed for active correction, a least intrusive change method may be utilized. The active correction process may determine the change that alters the least amount of operating instructions, such as operating instruction lines, and utilize that alteration. Alternatively, the active correction process may determine the change that alters the operation of the least amount of operating instructions and utilize that alteration. The active correction process may further perform regression testing on the alterations. Alterations that fail such regression testing may be reverted to the unaltered state. The active corrections performed and the alterations resulting in either passed or failed regression testing are then sent to the machine learning component to influence the active correction process for the tenants in the SaaS environment.

Figure 9:
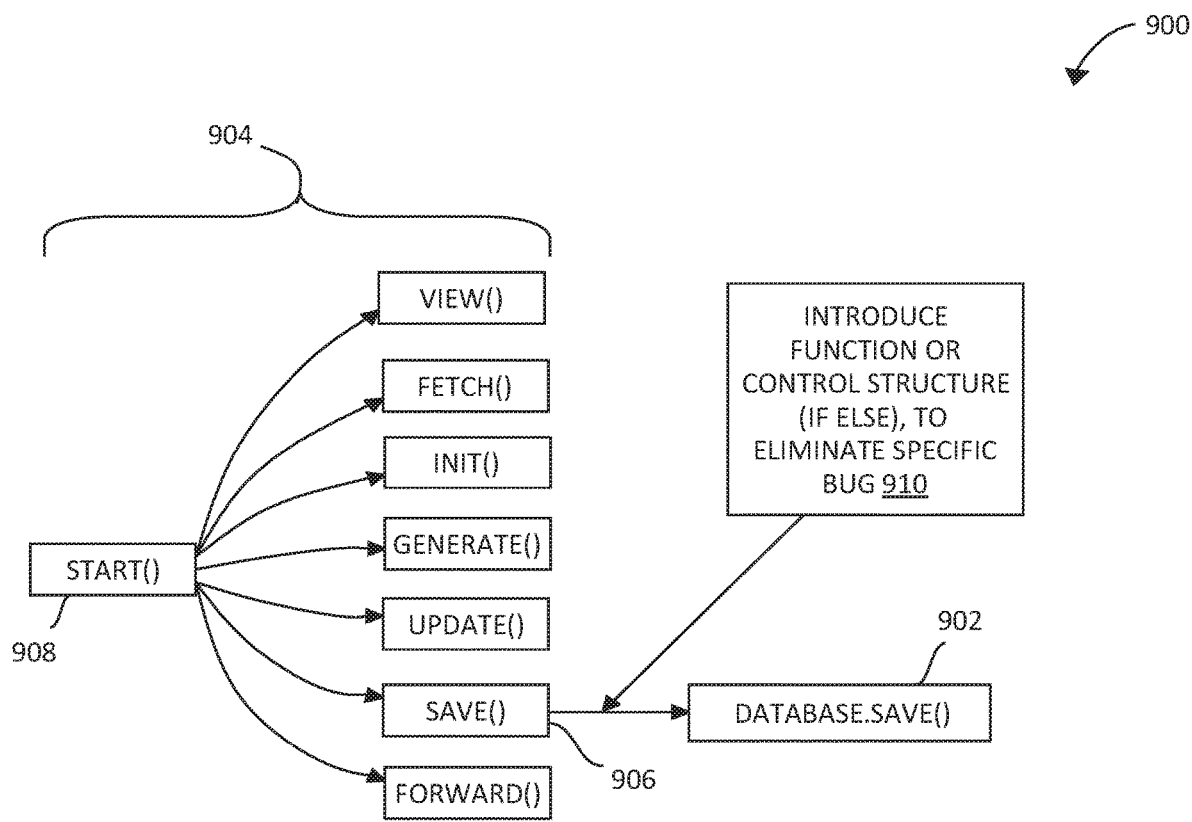
FIG. 9 illustrates an embodiment of a control flow 900.

Referring to FIG. 9, an exemplary control flow 900 comprises a security sensitive operation 902, a control flow steps 904, a call flow step 906, and a call flow step 908.

The security sensitive operation 902 is a database.save( ) function and has been determined to be accessed only by those who are privileged to perform this function. The control flow steps 904 are functions that are assessed to determine whether they may be utilized to access the security sensitive operation 902. The call flow step 906 (i.e., the save( )) is determined to have access to the security sensitive operation 902. The process of utilizing the call flow step 906 is assessed to determine if there is a proper authorization check. Additionally, the process of utilizing the call flow step 908 is assessed to determine if there is a proper authorization check, as the call flow step 908 has access to the security sensitive operation 902. In some embodiments, the call flow step 908 may be assessed after determining that the call flow step 906 does not have a proper authorization check. In other embodiments, the call flow step 906 may be assessed after determining that the call flow step 908 does not have a proper authorization check. If a proper authorization check is not achieved, a vulnerability is raised. In some embodiments, once the vulnerability is raised, an active correction process is performed, such as the active correction 910. For example, an additional function or control structure (e.g., if else structure) is introduced to correct the vulnerability. The structure selected may be influenced by structures utilized by the tenants in the SaaS environment via the machine learning component. Selected structures may then be sent to the machine learning component to influence further active correction processes.

The following example in one possible computer instruction language may be utilized to implement Control Flow Analysis:

```
start( )
{
...
privileged_operation(x, . . . );
}
```

Figure 10:
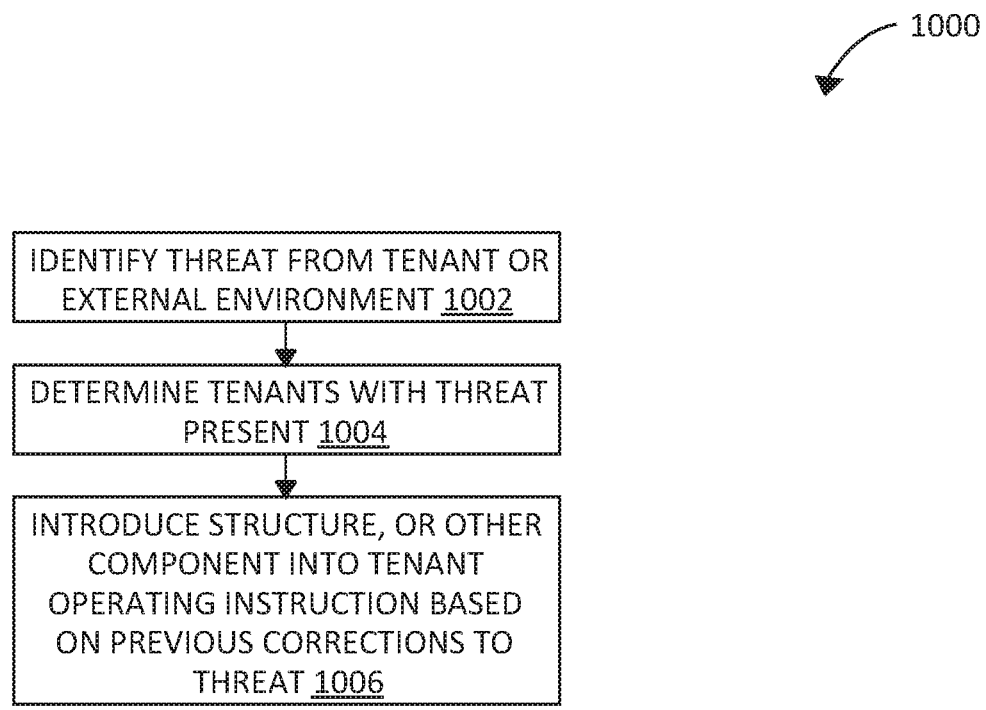
FIG. 10 illustrates an active correction process 1000 in accordance with one embodiment.

Referring to FIG. 10, an active correction process 1000 identifies a threat from tenant or external environment. A machine learning component may receive input from each tenant in the SaaS environment for each threat detected (block 1002). The machine learning component may also determine threats occurring outside the SaaS environment that are applicable to tenants within the SaaS environment. The tenants within the SaaS environment with the threat present or potentially present are then determined (block 1004). Structure, or other component, is introduced into the tenant operating instructions based on previous corrections to threat (block 1006). In other embodiments, an operation input may be sent to the tenant to initiate operate the security scanner, which is further influence by the detected threat.

Figure 11:
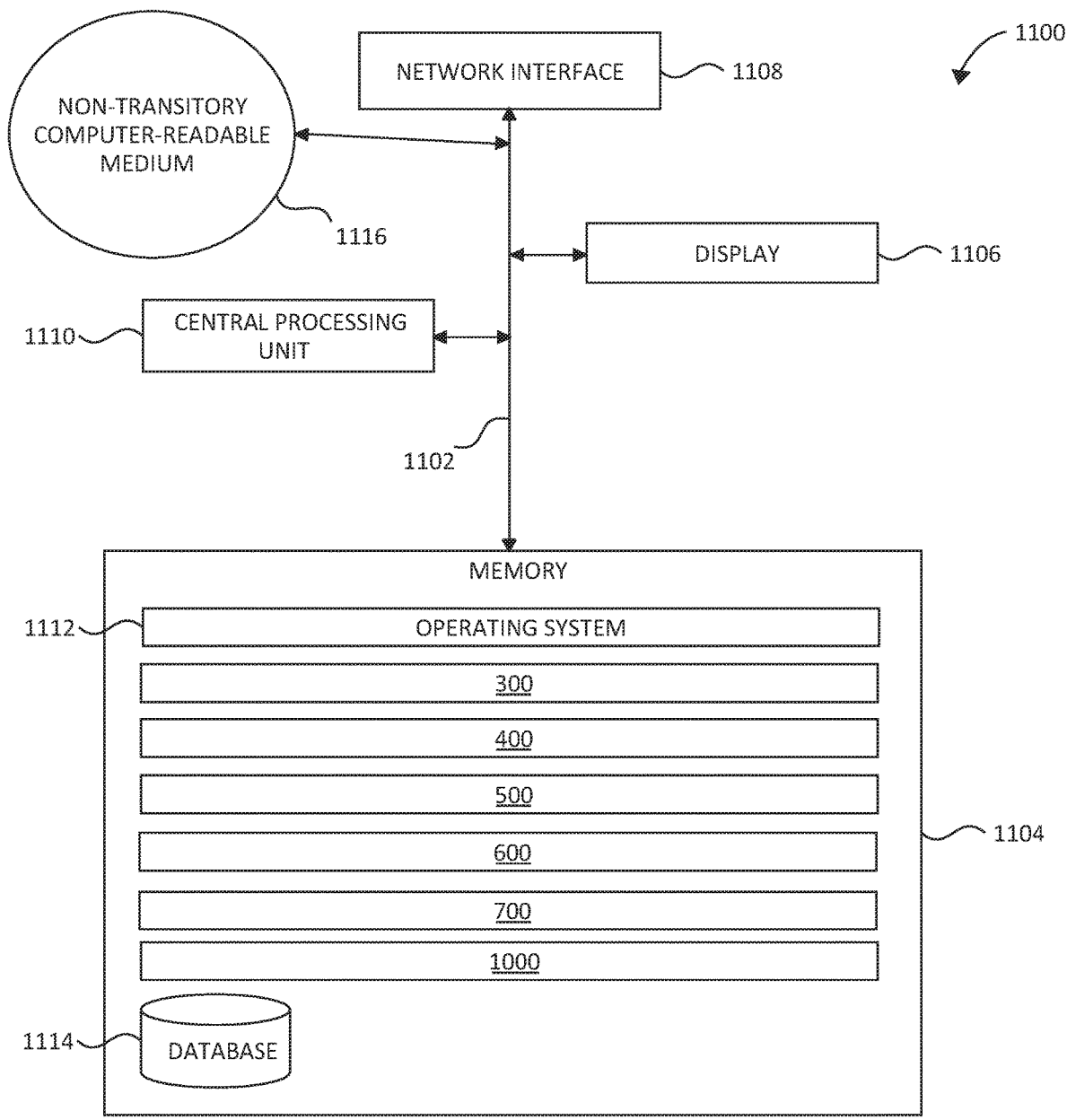
FIG. 11 illustrates a system 1100 in accordance with one embodiment.

FIG. 11 illustrates several components of an exemplary system 1100 in accordance with one embodiment. In various embodiments, system 1100 may include a desktop PC, server, workstation, mobile phone, laptop, tablet, set-top box, appliance, or other computing device that is capable of performing operations such as those described herein. In some embodiments, system 1100 may include many more components than those shown in FIG. 11. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, system 1100 may comprise one or more physical and/or logical devices that collectively provide the functionalities described herein. In some embodiments, system 1100 may comprise one or more replicated and/or distributed physical or logical devices.

In some embodiments, system 1100 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

System 1100 includes a bus 1102 interconnecting several components including a network interface 1108, a display 1106, a central processing unit 1110, and a memory 1104.

Memory 1104 generally comprises a random access memory ("RAM") and permanent non-transitory mass storage device, such as a hard disk drive or solid-state drive. Memory 1104 stores an operating system 1112.

These and other software components may be loaded into memory 1104 of system 1100 using a drive mechanism (not shown) associated with a non-transitory computer-readable medium 1116, such as a DVD/CD-ROM drive, memory card, network download, or the like.

Memory 1104 also includes database 1114. In some embodiments, system 1100 may communicate with database 1114 via network interface 1108, a storage area network ("SAN"), a high-speed serial bus, and/or via the other suitable communication technology.

In some embodiments, database 1114 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

Terms used herein should be accorded their ordinary meaning in the relevant arts, or the meaning indicated by their use in context, but if an express definition is provided, that meaning controls.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Programmable device" in this context refers to an integrated circuit designed to be configured and/or reconfigured after manufacturing. The term "programmable processor" is another name for a programmable device herein. Programmable devices may include programmable processors, such as field programmable gate arrays (FPGAs), configurable hardware logic (CHL), and/or any other type programmable devices. Configuration of the programmable device is generally specified using a computer code or data such as a hardware description language (HDL), such as for example Verilog, VHDL, or the like. A programmable device may include an array of programmable logic blocks and a hierarchy of reconfigurable interconnects that allow the programmable logic blocks to be coupled to each other according to the descriptions in the HDL code. Each of the programmable logic blocks may be configured to perform complex combinational functions, or merely simple logic gates, such as AND, and XOR logic blocks. In most FPGAs, logic blocks also include memory elements, which may be simple latches, flip-flops, hereinafter also referred to as "flops," or more complex blocks of memory. Depending on the length of the interconnections between different logic blocks, signals may arrive at input terminals of the logic blocks at different times.

"Software" in this context refers to logic implemented as processor-executable instructions in a machine memory (e.g. read/write volatile or nonvolatile memory or media).

"Associator" in this context refers to a correlator (see the definition for Correlator).

"Combiner" in this context refers to a logic element that combines two or more inputs into fewer (often a single) output. Example hardware combiners are arithmetic units (adders, multipliers, etc.), time-division multiplexers, and analog or digital modulators (these may also be implemented is software or firmware). Another type of combiner builds an association table or structure (e.g., a data structure instance having members set to the input values) in memory for its inputs. For example: val1, val2, val3→combiner logic→{val1, val2, val3} set.val1=val1; set.val2=val2; set.val3=val3; Other examples of combiners will be evident to those of skill in the art without undo experimentation.

"Comparator" in this context refers to a logic element that compares two or more inputs to produce one or more outputs that reflects similarity or difference of the inputs. An example of a hardware comparator is an operational amplifier that outputs a signal indicating whether one input is greater, less than, or about equal to the other. An example software or firmware comparator is: if (input1==input2) output=val1; else if (input1>input2) output=val2; else output=val3; Many other examples of comparators will be evident to those of skill in the art, without undo experimentation.

"Correlator" in this context refers to a logic element that identifies a configured association between its inputs. One examples of a correlator is a lookup table (LUT) configured in software or firmware. Correlators may be implemented as relational databases. An example LUT correlator is:

|low_alarm_condition|low_threshold_value|0|
|safe_condition|safe_lower_bound|safe_upper_bound|
|high_alarm_condition|high_threshold_value|0|

Generally, a correlator receives two or more inputs and produces an output indicative of a mutual relationship or connection between the inputs. Examples of correlators that do not use LUTs include any of a broad class of statistical correlators that identify dependence between input variables, often the extent to which two input variables have a linear relationship with each other. One commonly used statistical correlator is one that computes Pearson's product-moment coefficient for two input variables (e.g., two digital or analog input signals). Other well-known correlators compute a distance correlation, Spearman's rank correlation, a randomized dependence correlation, and Kendall's rank correlation. Many other examples of correlators will be evident to those of skill in the art, without undo experimentation.

"Code files" in this context refers to operating instructions for a tenant.

"Configurable settings" in this context refers to settings for a SaaS that may be altered for each tenant. E.g., password strength, invalid login attempts, two factor authentication, Transport Layer security, authentication controls, etc.

"Context aware malicious data" in this context refers to data generated to attack the tenants in the SaaS environment and, in some embodiments, may be specific threats identified that attacked a tenant in the SaaS environment or external source.

"Customization input" in this context refers to an input to a tenant that alters its configuration settings or operation instructions.

"Endpoint" in this context refers to a discoverable node of communication whose scope may be varied to narrow or broaden the discovery zone. Endpoints facilitate a standard programmable layer of abstraction whereby heterogeneous software systems and/or subsystems may communicate with each other and that the means of communication are decoupled from the communicating subsystems.

"External source" in this context refers to operating instructions, configurations, applications, malicious data, etc. present outside of the SaaS environment.

"Least intrusive change" in this context refers to a process that alters the least amount of operating instructions, such as operating instruction lines, and utilize that alteration. Alternatively, the active correction process may determine the change that alters the operation of the least amount of operating instructions and utilize that alteration.

"Exposed features" in this context refers to features of a SaaS environment, or a tenant within the SaaS environment through which a threat may be introduced.

"Operation input" in this context refers to an input initiating operation of a security scanner on a tenant within a SaaS environment. Exemplary operation inputs include customization inputs, detection of a malicious attack to the tenant or another tenant within the SaaS environment, failure of a security feature of the tenant or another tenant within the SaaS environment, etc.

"Regression test" in this context refers to a type of software testing that ensures that previously developed and tested software still performs the same way after it is changed or interfaced with other software. Changes may include software enhancements, patches, configuration changes, etc.

"Setting recommendations" in this context refers to alterations to the current state of the configurable settings.

"Similar code files" in this context refers to operation instructions or configuration settings of tenants or external sources with structure that exposes the instruction to attack from a threat. The instructions may utilize similar functions and variables.

"Software as a service (SaaS)" in this context refers to a software licensing and delivery model in which software is licensed on a subscription basis and is centrally hosted. It is sometimes referred to as "on-demand software". SaaS is typically accessed by users using a thin client via a web browser. SaaS has become a common delivery model for many business applications, including office and messaging software, payroll processing software, DBMS software, management software, CAD software, development software, gamification, virtualization, accounting, collaboration, customer relationship management (CRM), management information systems (MIS), enterprise resource planning (ERP), invoicing, human resource management (HRM), talent acquisition, content management (CM), and service desk management.

"Threat" in this context refers to a security risk to a tenant or external source, such as malicious code that attacks existing operating instruction, alterations to operating instructions or configuration setting that may introduce malicious code, etc.

"Tenant" in this context refers to a group of users who share a common access with specific privileges to the software instance.

"Transport Layer Security (TLS)" in this context refers to cryptographic protocols that provide communications security over a network. TLS is used to secure all communications between servers over computer networks. The TLS protocol aims primarily to provide privacy and data integrity between two communicating computer applications. When secured by TLS, connections between a client (e.g., an API, browser, mobile device) and a server (e.g., SaaS application) can be private and not susceptible to network eavesdropping. TLS also provides the added benefit of identity verification between the communicating parties due to the use of public-key cryptography.

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

What is claimed is:

1. A security scanner within a tenant in a SaaS environment, comprising:
   an operation input receiver configured to receive an operation input at the tenant;
   a configuration review engine configured to determine a current state of configurable settings of the tenant;
   a static code analyzer configured to generate a list of exposed features for the tenant;
   a malicious data generator configured to generate context aware malicious data for the tenant, wherein the generation of context aware malicious data includes comparing a current data schema and layout utilized by the SaaS environment to other data schema and layouts that have been determined to be susceptible to specific malicious data, and utilizing the specific malicious data to generate the context aware malicious data;

a runtime security analysis engine generator configured to:

map code files for the tenant; and generate a runtime security analysis engine from the current state of the configurable settings, the list of exposed features, the context aware malicious data, and the code files mapped; and a runtime security analysis engine executor configured to generate an output to influence operation of the tenant.

2. The security scanner of claim 1, wherein the configuration review engine is further configured to generate setting recommendations from the current state of the configurable settings to influence operation of the tenant.

3. The security scanner of claim 1, wherein the operation input is a customization input, the customization input altering the code files of the tenant.

4. The security scanner of claim 1, wherein the operation input is received from a machine learning component.

5. The security scanner of claim 4, wherein the machine learning component is configured to:

featurize the code files of one or more other tenants;

label the code files featurized with the output of the one or more other tenants;

determine the tenant has similar code files to the one or more other tenants; and send the operation input to the tenant.

6. The security scanner of claim 4, wherein the machine learning component is configured to:

determine another tenant has a threat;

featurize the code files of the other tenant;

label the code files featurized with the threat;

determine the tenant has similar code files to the one of the one or more tenants other tenant; and send the operation input to the tenant.

7. The security scanner of claim 4, wherein the machine learning component is configured to:

determine an external source has a threat;

featurize the code files of the external source;

label the code files featurized with the threat;

determine the tenant has similar code files to the external source; and send the operation input to the tenant.

8. The security scanner of claim 1, wherein the runtime security analysis engine executor alters the code files of the tenant to remove a threat.

9. The security scanner of claim 8, wherein the code files are altered by a least intrusive change.

10. The security scanner of claim 8, wherein the runtime security analysis engine executor is configured to:

perform a regression test on the code files altered;

determine whether the regression test passed or failed; and revert the code files for a failed regression test.

11. A method for use in a security scanner within a tenant in a SaaS environment, the security scanner including an operation input receiver, a configuration review engine, a static code analyzer, a malicious data generator, a runtime security analysis engine generator, and a runtime security analysis engine executor, the method comprising:

receiving, by the operation input receiver, an operation input for the tenant;

determining, by the configuration review engine, a current state of configurable settings of the tenant;

generating, by the static code analyzer, a list of exposed features for the tenant;

generating, by the malicious data generator, context aware malicious data for the tenant, wherein the generation of context aware malicious data includes comparing a current data schema and layout utilized by the SaaS environment to other data schema and layouts that have been determined to be susceptible to specific malicious data, and utilizing, by the malicious data generator, the specific malicious data to generate the context aware malicious data;

mapping, by the runtime security analysis engine generator, code files for the tenant;

generating, by the runtime security analysis engine generator, a runtime security analysis engine from the current state of the configurable settings, the list of exposed features, the context aware malicious data, and the code files mapped; and executing, by the runtime security analysis engine executor, the runtime security analysis engine to generate an output to influence operation of the tenant.

12. The method of claim 11, further comprising generating setting recommendations from the current state of the configurable settings to influence the operation of the tenant.

13. The method of claim 11, further comprising:

detecting a customization input to the tenant, the customization input altering the code files of the tenant; and utilizing the customization input as the operation input.

14. The method of claim 11, further comprising receiving the operation input from a machine learning component in response to a threat.

15. The method of claim 14, wherein the context aware malicious data is generated from the threat.

16. The method of claim 14, wherein the threat is received by the machine learning component from the one or more tenants, the machine learning component determining the threat applicable to the tenant in an ongoing/continuous manner.

17. The method of claim 14, wherein the threat is received by the machine learning component from an external source, the machine learning component determining the threat applicable to the tenant in an ongoing/continuous manner.

18. The method of claim 11, further comprising altering the code files in response to the output indicating a threat to remove the threat.

19. The method of claim 18, wherein the code files are altered by a least intrusive change.

20. The method of claim 18, further comprising performing a regression test on the code files altered.

* * * * *